(12) United States Patent
Woo et al.

(10) Patent No.: US 9,747,692 B2
(45) Date of Patent: Aug. 29, 2017

(54) RENDERING APPARATUS AND METHOD

(71) Applicant: Samsung Electronics Co., Ltd., Suwon-si (KR)

(72) Inventors: Sangoak Woo, Anyang-si (KR); Changmoo Kim, Seoul (KR); Seungin Park, Hwaseong-si (KR); Haewoo Park, Seoul (KR); Minsu Ahn, Seoul (KR); Soojung Ryu, Hwaseong-si (KR); Hyongeuk Lee, Suwon-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 17 days.

(21) Appl. No.: 14/803,754

(22) Filed: Jul. 20, 2015

(65) Prior Publication Data

US 2016/0086340 A1    Mar. 24, 2016

(30) Foreign Application Priority Data

Sep. 22, 2014  (KR) .......................... 10-2014-0126054

(51) Int. Cl.
*G06T 7/00*    (2017.01)
*G06T 7/40*    (2017.01)
*G06T 15/80*   (2011.01)
*G06T 1/60*    (2006.01)
*G06T 15/40*   (2011.01)

(52) U.S. Cl.
CPC .............. *G06T 7/0051* (2013.01); *G06T 7/40* (2013.01); *G06T 15/405* (2013.01)

(58) Field of Classification Search
USPC ......................................... 345/419, 422, 506
See application file for complete search history.

(56) References Cited

U.S. PATENT DOCUMENTS

| | | | |
|---|---|---|---|
| 7,375,727 B1 * | 5/2008 | Greene ................. | G06T 15/405 345/419 |
| 8,395,619 B1 | 3/2013 | Diard | |
| 2006/0209078 A1* | 9/2006 | Anderson ............. | G06T 15/005 345/506 |
| 2008/0170066 A1 | 7/2008 | Falchetto | |
| 2008/0211810 A1 | 9/2008 | Falchetto | |
| 2008/0225048 A1* | 9/2008 | Bijankumar ............ | G06T 15/40 345/421 |
| 2009/0322747 A1 | 12/2009 | Farrell | |
| 2010/0007662 A1* | 1/2010 | Cox ........................ | G06T 15/40 345/420 |

FOREIGN PATENT DOCUMENTS

KR    10-1009521 B1    1/2011

* cited by examiner

*Primary Examiner* — Kimberly A Williams

(57) ABSTRACT

Provided are a rendering method and a rendering apparatus performing the rendering method. The rendering method includes receiving a request to output a hierarchical depth value stored in a hierarchical depth buffer, outputting the hierarchical depth value from the hierarchical depth buffer, storing the hierarchical depth value, in response to the request, and performing rendering using the stored hierarchical depth value.

18 Claims, 8 Drawing Sheets

| HIERARCHICAL DEPTH TEXTURE ID | IS IT HIERARCHICAL DEPTH TEXTURE? | TEXTURE SIZE (W, H) | HIERARCHICAL LEVE (Min, Max) | Bytes/Texel | Base Address |
|---|---|---|---|---|---|
| 0 | YES | (512, 512) | (0, 9) | 4 | 0xASDFASDF |
| 1 | NO | ... | | 2 | 0xASDFASDF |
| 2 | NO | | | | |
| ... | | | | | |

RENDERING APPARATUS AND METHOD

RELATED APPLICATION

This application claims the benefit under 35 USC 119(a) of Korean Patent Application No. 10-2014-0126054, filed on Sep. 22, 2014, in the Korean Intellectual Property Office, the entire disclosure of which is incorporated herein by reference for all purposes.

BACKGROUND

1. Field

The following description relates to a rendering apparatus and a rendering method for performing rendering by using a hierarchical-organized depth value.

2. Description of Related Art

Three-dimensional (3D) graphics application programming interface (API) standards include OpenGL, OpenGL ES, and Direct 3. API standards include methods of rendering on each frame and displaying an image. When rendering is performed on each frame, a large amount of computation is performed and a large amount of power is consumed. Accordingly, it is desirable to reduce the computational amount and the number of accesses to a memory when rendering is performed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Provided are methods and apparatuses for storing a hierarchically-organized depth value, which is generated during a rendering operation, in a separate memory.

Provided are methods and apparatuses for performing rendering using a hierarchically-organized depth value, which is stored in a separate memory.

According to an aspect there is provided a method of rendering including receiving a request to output a hierarchical depth value stored in a hierarchical depth buffer, outputting the hierarchical depth value from the hierarchical depth buffer, storing the hierarchical depth value, in response to the request, and performing rendering using the stored hierarchical depth value.

The receiving of the request may include receiving a request to output a hierarchical depth value of a specific hierarchical depth buffer, or a hierarchical depth value corresponding to a specific hierarchical level of the hierarchical depth value.

The method may include receiving address information of a memory from a device driver, wherein the storing of the hierarchical depth value may include storing the hierarchical depth value in the memory according to the address information.

The performing of the rendering may include comparing a depth value of a specific pixel with the stored hierarchical depth value, and performing rendering on the specific pixel based on the comparison.

The comparing of the depth value of the specific pixel with the stored hierarchical depth value may include generating an address of a hierarchical depth value corresponding to the specific pixel, reading the hierarchical depth value corresponding to the specific pixel from a memory according to the generated address, and comparing the read hierarchical depth value with the stored hierarchical depth value.

The performing of the rendering may include generating an address of a specific hierarchical depth value, reading the specific hierarchical depth value according to the generated address, and performing rendering using the specific hierarchical depth value.

The specific hierarchical depth value may include a maximum value or a minimum value of hierarchical depth values.

The request to output the hierarchical depth value may be received from an application.

The method may include receiving a request to load the hierarchical depth value stored in a memory from the application, and loading the hierarchical depth value from the memory, in response to the request.

In response to a first rendering and a second rendering being sequentially performed the storing of the hierarchical depth value may include outputting the hierarchical depth value from the hierarchical depth buffer and storing the hierarchical depth value in a preset memory based on the request, and the performing of the rendering may include performing rendering using the stored hierarchical depth value in the second rendering.

In another aspect there is provided a rendering apparatus including a command buffer configured to receive a request to output a hierarchical depth value stored in a hierarchical depth buffer, an output unit configured to output the hierarchical depth value from the hierarchical depth buffer and to store the hierarchical depth value in a preset memory, in response to the request, and a rendering unit configured to perform rendering using the stored hierarchical depth value.

The command buffer may be further configured to receive a request to output a hierarchical depth value of a specific hierarchical depth buffer, or a hierarchical depth value corresponding to a specific hierarchical level of the hierarchical depth value.

The command buffer may be further configured to receives address information of the memory from a device driver, and the output unit may be further configured to stores the hierarchical depth value in the memory according to the address information.

The rendering unit may include a texture unit configured to compare a depth value of a specific pixel with the stored hierarchical depth value, and a shading unit configured to perform rendering on the specific pixel according to the comparison.

The texture unit may include an address generating unit configured to generate an address of a hierarchical depth value corresponding to the specific pixel, a cache configured to read the hierarchical depth value corresponding to the specific pixel from the memory according to the generated address, and a depth test unit configured to compare the read hierarchical depth value with the stored hierarchical depth value.

The rendering unit may include an address generating unit configured to generate an address of a specific hierarchical depth value and to read the specific hierarchical depth value according to the generated address, and a shading unit configured to perform rendering using the specific hierarchical depth value.

The specific hierarchical depth value may include a maximum value or a minimum value of hierarchical depth values.

The command buffer may receive a request to load the hierarchical depth value stored in the memory from the application, and the output unit may be further configured to loads the hierarchical depth value from the memory, in response to the request.

In response to a first rendering and a second rendering being performed sequentially, the output unit may be further configured to output the hierarchical depth value from the hierarchical depth buffer and to store the hierarchical depth value in a preset memory based on the request, and the rendering unit may be further configured to perform rendering using the stored hierarchical depth value in the second rendering.

The device driver may be further configured to generate a mapping table for an ID and a memory address of each of the hierarchical depth buffer.

In another aspect there is provided a method of performing depth test for rendering including generating an address of a hierarchical depth value in a hierarchical depth buffer corresponding to an input pixel, determining the hierarchical depth value corresponding to the generated address, determining whether a hierarchical level of the determined hierarchical depth value is a lowest hierarchical level, in response to a depth value of the input pixel being lesser than the determined hierarchical depth value, and performing rendering using the determined hierarchical depth value, in response to a depth value of the input pixel being greater than the determined hierarchical depth value.

The method may include comparing a depth value stored in the memory with the depth value of the input pixel, in response to the hierarchical level being the lowest hierarchical level, and performing rendering using the depth value stored in the memory, in response to the depth value of the input pixel being greater than the determined hierarchical depth value.

Other features and aspects will be apparent from the following detailed description, the drawings, and the claims.

Figure 1:
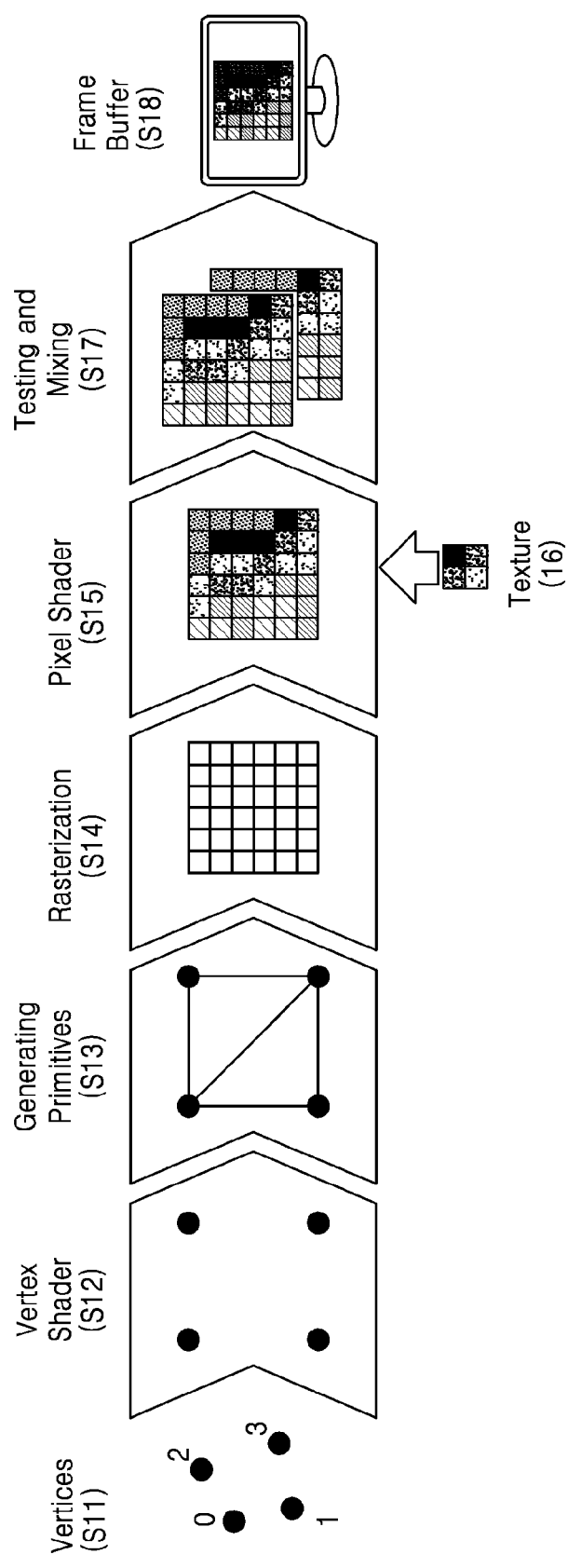
FIG. 1 is a diagram illustrating an example of a process of rendering a three-dimensional (3D) image.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses, and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

When an element is referred to as being "connected" to another element, it may be directly connected to the other element or may be indirectly connected to the other element with element(s) interposed therebetween. It will also be understood that the terms "comprises," "includes," and "has," when used herein, specify the presence of stated elements, but do not preclude the presence or addition of other elements, unless otherwise defined.

FIG. 1 is a diagram illustrating an example of a process of rendering a three-dimensional image, which is performed by a rendering apparatus.

Referring to FIG. 1, the figures shown in the lower portion of FIG. 1 conceptually represent processing of vertices or pixels at respective operations.

Operation 11 is an operation of generating vertices indicating an image. The vertices are generated in order to describe objects included in the image.

Operation 12 is an operation of shading the generated vertices. A vertex shader may perform shading on the vertices by assigning colors to the vertices generated in operation 11.

Operation 13 is an operation of generating primitives. The term 'primitive' refers to a polygon that is formed of points, lines, or vertices. For example, a primitive may be a triangle formed by connecting three vertices.

Operation 14 is an operation of rasterizing a primitive. When the primitive is rasterized, the primitive is divided into a plurality of fragments. The term 'fragment' refers to a portion of a primitive and may be a basic unit for performing image processing. A primitive includes only information on vertices. Accordingly, interpolation is performed when fragments between vertices are generated during rasterization.

Operation 15 is an operation of shading pixels. Although shading is performed in units of pixels, shading may be performed in units of fragments. For example, when pixels or fragments are shaded, it means that colors are assigned to the pixels or the fragments.

Operation 16 is an operation of texturing the pixels or the fragments. Texturing is a method of using a previously generated image when a color is assigned to a pixel or a fragment. For example, when a color is assigned to a fragment, shading is performed through computation whereas texturing is performed by assigning the same color as a color of an image that has been previously generated to a fragment corresponding to the image.

In operation 15 or 16, a large amount of computation is required to shade or texture each pixel or fragment. Accordingly, it is advantageous to reduce the computational amount by more efficiently performing shading or texturing. Examples of methods of reducing the computational amount during shading include but are not limited to, Z-test (or a depth test) and a hidden surface removal (HSR). HSR is a method that does not perform shading on a first object covered by a second object that is disposed in front of the first object.

The depth test compares a depth value of each input pixel with a depth value of a corresponding depth buffer. When the depth value of the input pixel is closer to a viewpoint than the depth value of the buffer (i.e., when the depth test is successful), the depth value of the depth buffer is updated with the depth value of the input pixel. In order to accelerate a computation speed of the depth test, a hierarchically-organized depth value is used. Such a hierarchically-organized depth value may be stored in a hierarchical depth buffer.

The term "hierarchically-organized depth value" refers to a depth value that is generated with a plurality of hierarchical levels, based on a depth value. For example, assuming that there is a depth value having a 64×64-pixel size, when one representative depth value (for example, an average value) is set to each group of four square pixels, it is possible to acquire a hierarchical depth value (first hierarchical value) having a first level of a 16×16-pixel size. Similarly, when one representative depth value is set to each group of four square pixels in the first hierarchical depth value, it is possible to acquire a hierarchical depth value (second hierarchical depth value) having a second level of a 4×4-pixel size. Also, in the same manner, it is possible to acquire a third hierarchical depth value. Hereinafter, a hierarchically-organized depth value is referred as a hierarchical depth value.

Operation 17 is an operation of performing testing and mixing.

Operation 18 is an operation of displaying a frame that is stored in a frame buffer. A frame generated through operations 11 through 17 is stored in the frame buffer. The frame that is stored in the frame buffer is displayed on a display device.

When the depth test is performed during rendering, a hierarchical depth value is temporarily used and then discarded, and a depth value from a depth buffer is stored in the memory upon completion of the rendering. In a subsequent rendering or computation operation, computation may be performed to hierarchically organize a depth value which has been stored in a previous rendering operation. Therefore, according to the following description, a computational amount may be reduced by storing a hierarchical depth value in a memory during a previous rendering operation and then using the stored hierarchical depth value.

The rendering apparatus may store a hierarchical depth value generated during a depth test of a rendering operation in an external memory.

Figure 2:
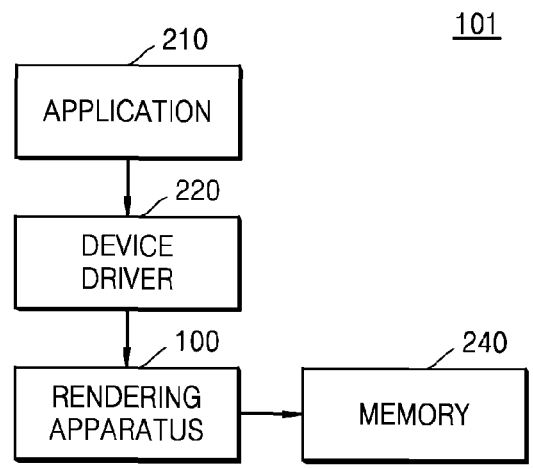
FIG. 2 is a diagram illustrating an example of a rendering system.

FIG. 2 is a diagram illustrating an example of a rendering system 101. The rendering system 101 may include an application 210, a device driver 220, a rendering apparatus 100, and a memory 240.

According to a non-exhaustive example, the application 210 may provide the device driver 220 with information on whether to output and store a hierarchical depth value generated in a depth test, through an application program interface (API). In this case, the application 210 may provide the device driver 220 with the information on whether to output and store a hierarchical depth value, according to an API standard, such as OpenGL, OpenGL ES, or Direct 3. The application 210 may provide the device driver 220 with information on whether to output and store a hierarchical depth value at a specific level. For example, the application 210 may provide the device driver 220 with information on whether to output and store a specific hierarchical depth value of a first hierarchical value and a second hierarchical. The information on whether to output and store a hierarchical depth value may be set in units of objects in a frame buffer.

The application 210 transfers the API to the rendering apparatus 100 to perform a subsequent computation using the hierarchical depth value stored in the memory 240.

The device driver 220 may analyze the API received from the application 210, convert the API into a command that is capable of being processed by the rendering apparatus 200, and transfer the command to the rendering apparatus 100.

The device driver 220 may analyze the received API and acquire the command that is capable of being processed by the rendering apparatus 100 based on the information on whether to output and store a depth value from a depth buffer, or a hierarchical depth value from a hierarchical depth buffer, or information regarding which level a hierarchical value is to be output and stored.

The device driver may acquire a memory address at which the depth value from the depth buffer or the hierarchical depth value from the hierarchical depth buffer is to be stored and may transfer the memory address to the rendering apparatus 100. The device driver 220 may secure a memory for storage of the hierarchical depth value.

The device driver 220 may transfer a query for a hierarchical level of a storable hierarchical depth value to the rendering apparatus 100.

The device driver 220 may provide a unique ID for each hierarchical depth buffer in which storage is to be performed. That is, the device driver 220 may provide a unique ID for each hierarchical depth buffer, and store a hierarchical depth value included in a hierarchical depth buffer having a specific ID in a designated memory. The application 210 may request output and storage of the hierarchical depth value having a specific ID, which is included in the hierarchical depth buffer. The application 210 may request loading of the hierarchical depth value included having the specific ID in the hierarchical depth buffer from among hierarchical depth values stored in the memory.

When the device driver 220 provides a unique ID for each hierarchical depth buffer, the device driver 220 may generate and manage a mapping table for an ID of the hierarchical depth buffer and a memory address at which the hierarchical depth buffer is to be stored. For example, when the device driver 220 allocates an ID to the hierarchical depth buffer, the device driver 220 may calculate a memory space depending on whether a resolution and a type of the depth value are 32 bit or 16 bit, and secure the memory space. The device driver 220 may generate and manage a mapping table for an ID of the hierarchical depth buffer, a memory space, a memory address, and the like.

The rendering apparatus 100 may output the hierarchical depth value from the hierarchical depth buffer and store the hierarchical depth value in a preset memory, according to a command transferred from the device driver. Specifically, the rendering apparatus 100 may receive an output command and a storage command for the hierarchical depth value from the device driver 220, and store the hierarchical depth value in the memory 240 corresponding to an address included in the storage command.

The hierarchical depth value or the depth value generated by the rendering apparatus 100 may be stored in the memory 240. The memory 240 may provided in the rendering apparatus 100, or may be provided outside the rendering apparatus 100.

Figure 3:
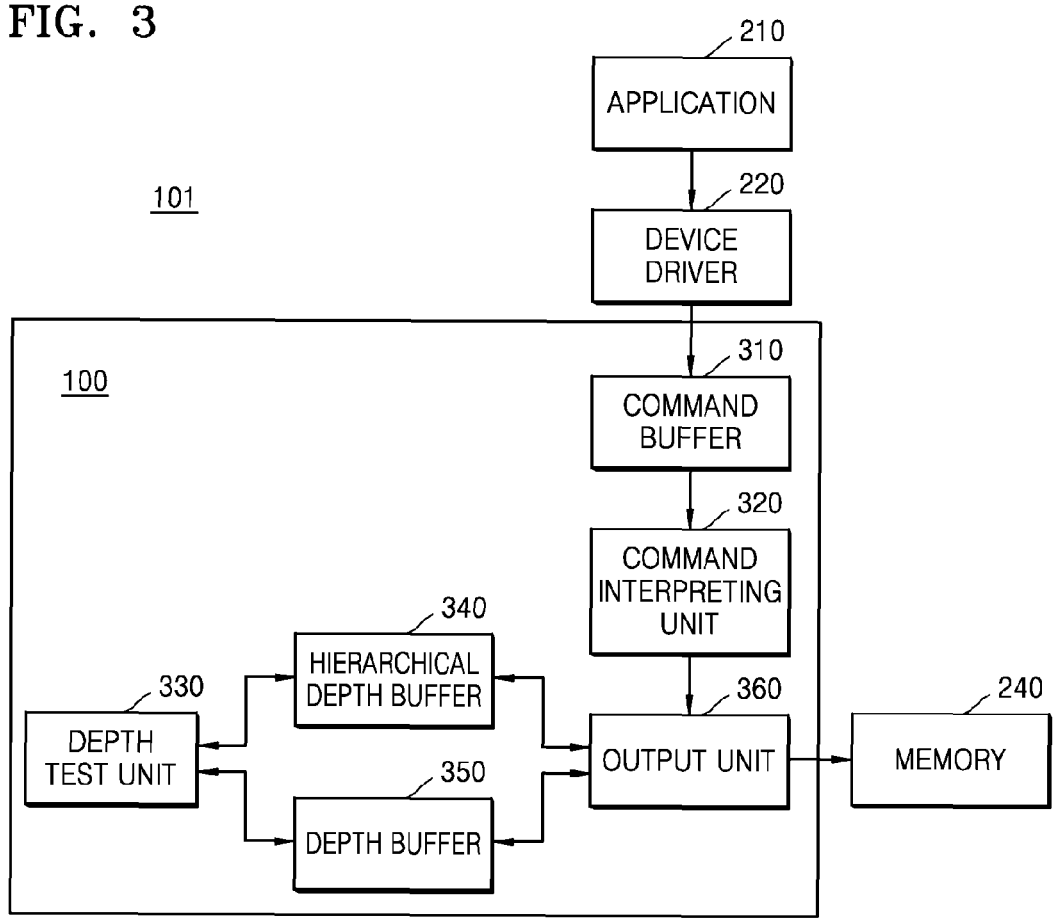
FIG. 3 is a diagram illustrating another example of the rendering system of FIG. 2.

FIG. 3 is a diagram illustrating an example of the rendering apparatus 100 of the rendering system 101. The rendering system 101 may include an application 210, a device driver 220, a rendering apparatus 100, and a memory 240. The application 210, the device driver 220, and the memory 240 of FIG. 3 are described with reference to FIG. 2. The description of FIG. 2 is also applicable to FIG. 3, and thus will not be repeated here.

The rendering apparatus 100 may include a command buffer 310, a command interpreting unit 320, a depth test unit 330, a hierarchical depth buffer 340, a depth buffer 350, and an output unit 360. In the example illustrated in FIG. 3, the memory 240 is illustrated as being provided separately from the rendering apparatus 100, the memory 240 may be included in the rendering apparatus 100.

The command buffer 310 may store commands transferred from the device driver 220. A command may include information on whether to store the depth value or the hierarchical depth value, information on whether to store a hierarchical value at a specific level, and a storage memory address. The command buffer 310 may provide a response to a query for a hierarchical level of a storable hierarchical depth value.

The command interpreting unit 320 may transfer information on whether to output and store the hierarchical depth value in an external memory to the output unit 360 based on the command from the command buffer 310.

The depth buffer 350 may store a depth value for each pixel. In another non-exhaustive example, the depth buffer 350 may be substituted with a depth cache.

The hierarchical depth buffer 340 may store the hierarchical depth value. In another non-exhaustive example, the hierarchical depth buffer 340 may be substituted with a hierarchical depth cache.

The depth test unit 330 compares a depth value of an input pixel with the depth value stored in the depth buffer 350 or the hierarchical depth value stored in the hierarchical depth buffer 340. The depth test unit 330 may update a depth value of a pixel stored in the depth buffer 350 with the depth value of the input pixel when the depth value of the input pixel is smaller than the depth value of the pixel stored in the depth buffer 350 (i.e., when it is viewed as being closer to a screen). The depth test unit 330 may compare the depth value of the input pixel with the hierarchical depth value stored in the hierarchical depth buffer 340 in order to reduce a computational amount. When the depth value of the input pixel is smaller than the hierarchical value, the depth test unit 330 may update the hierarchical depth value and a hierarchical depth value corresponding to a lower level than the hierarchical depth value, or update all depth values.

The output unit 360 may output and store the depth value or the hierarchical depth value stored in the depth buffer 350 or the hierarchical depth buffer 340 in the memory 240 that is preset. The command transferred by the command interpreting unit 320 may indicate an instruction to output and store a hierarchical depth value at a specific level of hierarchical depth values.

The rendering apparatus 100 may store the hierarchical depth value in a separate memory during a rendering operation and use the hierarchical depth value that is stored during another rendering operation or a computation operation, thereby reducing the computational amount. For example, in a radiosity rendering, which expresses reflections of light, three images (for example, a color image, a normal image, and a depth image) are output simultaneously in order to generate a final image (frame). In this case, in an indirect light generating and arranging operation, a computation is performed to generate a hierarchical depth image (equivalent to hierarchical depth buffer) through a depth image (equivalent to depth buffer). The computation can be reduced by using a previously stored hierarchical depth value in the indirect light generating and arranging operation.

Figure 4:
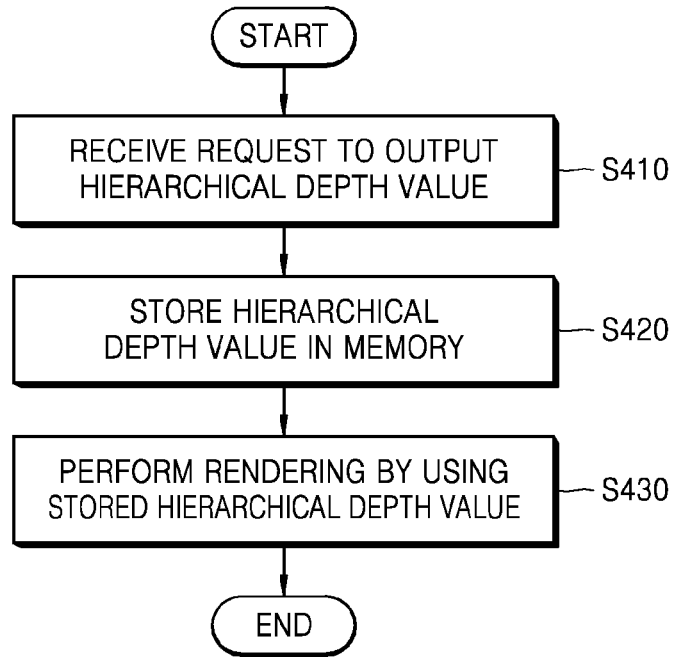
FIG. 4 is a diagram illustrating an example of a method of rendering.

FIG. 4 is a diagram illustrating an example of a method of rendering using a hierarchical depth value in the rendering apparatus 100. The operations in FIG. 4 may be performed in the sequence and manner as shown, although the order of some operations may be changed or some of the operations omitted without departing from the spirit and scope of the illustrative examples described. Many of the operations shown in FIG. 4 may be performed in parallel or concurrently. The above descriptions of FIGS. 1-3, is also applicable to FIG. 4, and is incorporated herein by reference. Thus, the above description may not be repeated here.

In S410, the rendering apparatus 100 may receive a request to output the hierarchical depth value from an application. The rendering apparatus 100 may receive a request to output and store the hierarchical depth value, which are transferred from the application, through a device driver. The device driver may analyze an API of the application and transfer a command, which is capable of being processed by the rendering apparatus 100, to the rendering apparatus 100. The rendering apparatus 100 may receive a request to output and store a hierarchical depth value at a specific hierarchical level of hierarchical depth values or hierarchical depth values corresponding to a plurality of specific hierarchical levels. The rendering apparatus 100 may receive a memory address at which the hierarchical depth value is to be stored from the device driver.

In S420, the rendering apparatus 100 may output the hierarchical depth value from the hierarchical depth buffer and store the hierarchical depth value in the preset memory, based on the request to output the hierarchical depth value from the application. When rendering for an image is completed, the rendering apparatus 100 may output the hierarchical depth value from the hierarchical depth buffer and store the hierarchical depth value in the preset memory. The rendering apparatus 100 may store the hierarchical depth value in a portion of the memory corresponding to the address transferred from the device driver. In S410, the device driver may provide a unique ID for each hierarchical depth buffer and the rendering apparatus 100 may output a hierarchical depth value from a hierarchical depth buffer corresponding to a specific ID and store the hierarchical depth value in the preset memory. The rendering apparatus 100 may store a hierarchical depth value corresponding to a specific hierarchical level or hierarchical depth values corresponding to a plurality of specific hierarchical levels from among hierarchical depth values.

In S430, the rendering apparatus 100 may perform rendering by using the hierarchical depth value stored in the memory. An example of a rendering operation using a hierarchical depth value is the indirect light generating and arranging operation in the radiosity rendering, which will be described in detail below.

Figure 5:
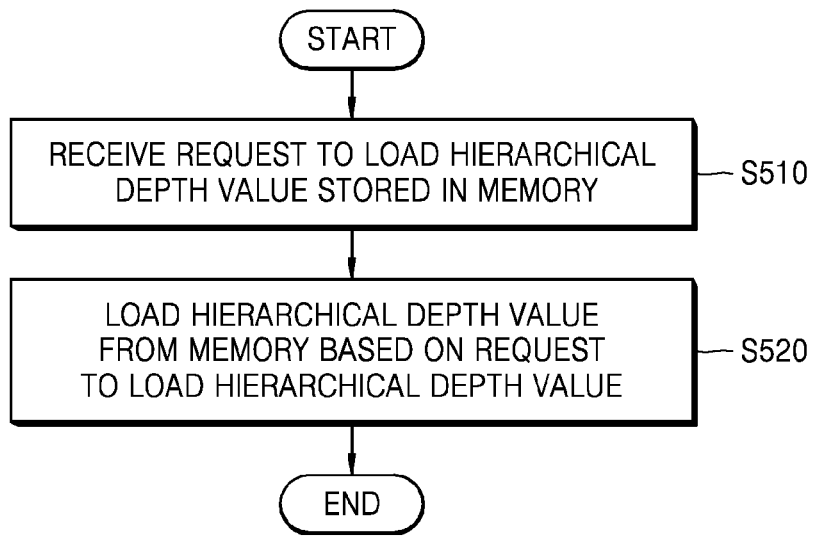
FIG. 5 is a diagram illustrating an example of a method of loading a hierarchical depth value stored in a memory by a rendering apparatus.

FIG. 5 is a diagram explaining a method of loading a hierarchical depth value stored in a memory in the rendering apparatus 100. The operations in FIG. 5 may be performed in the sequence and manner as shown, although the order of some operations may be changed or some of the operations omitted without departing from the spirit and scope of the illustrative examples described. Many of the operations shown in FIG. 5 may be performed in parallel or concurrently. The above descriptions of FIGS. 1-4, is also applicable to FIG. 5, and is incorporated herein by reference. Thus, the above description may not be repeated here.

In operation S510, the rendering apparatus 100 may be requested to load a hierarchical depth value stored in a memory by an application. The rendering apparatus 100 may be requested to load a hierarchical depth value from the hierarchical depth buffer corresponding to a specific ID from the application. The rendering apparatus 100 may be requested to load a hierarchical depth value corresponding to a specific hierarchical level or hierarchical depth values corresponding to a plurality of specific hierarchical levels from among hierarchical depth values stored in a preset memory.

In operation S520, the rendering apparatus 100 may load the hierarchical depth value requested by the application from the present memory. The rendering apparatus 100 may acquire a memory address through an ID for the hierarchical depth buffer and load the hierarchical depth value from a portion of the memory corresponding to the acquired address.

Figure 6:
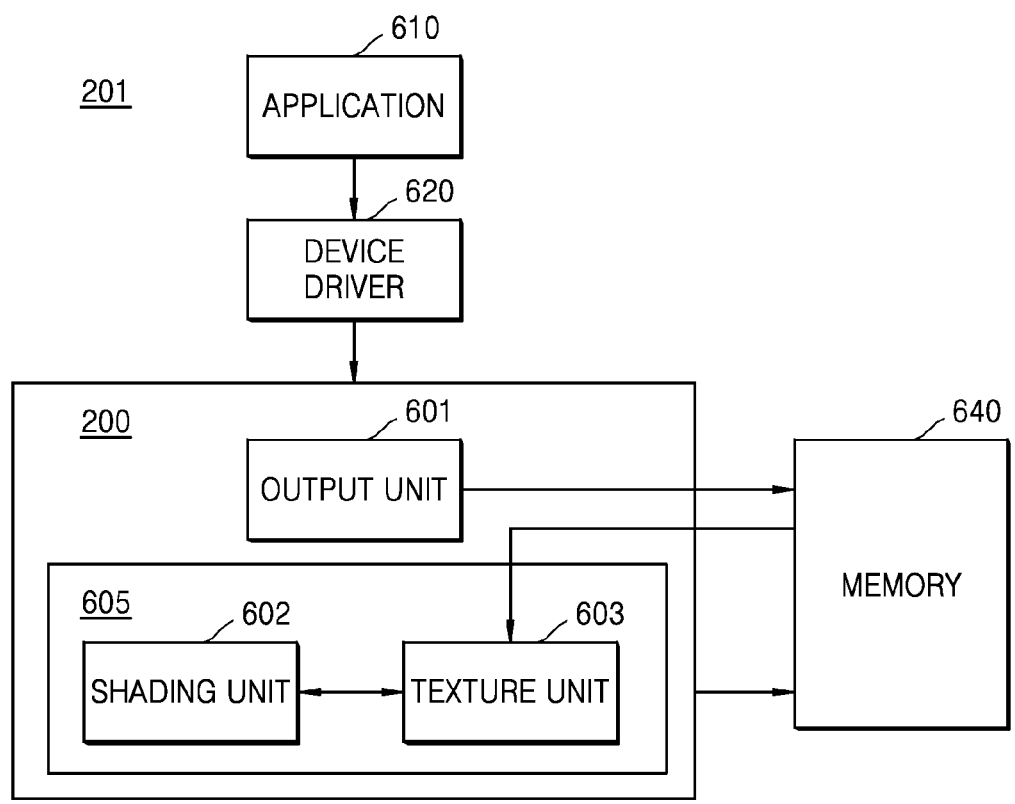
FIG. 6 is a diagram illustrating an example of a rendering system.

FIG. 6 is a diagram illustrating an example of another rendering system 201. The rendering system 201 may include an application 610, a device driver 620, a rendering apparatus 100, and a memory 640.

The application 610, the device driver 620, and the memory 640 are similar to the application 210, the device driver 220, and the memory 240 of FIG. 2. The description of FIG. 2 is also applicable to FIG. 6, and thus will not be repeated here.

The rendering system 201 may perform successive rendering. For example, the rendering system 201 may generate a final image by using an image generated through first rendering in a second rendering. The device driver 620 may analyze an API of the application 610 and instruct the rendering apparatus 200 to store a hierarchical depth value of the hierarchical depth buffer in the memory 640 during the first rendering. The device driver 620 may instruct the rendering apparatus 200 to perform the second rendering using the hierarchical depth value that has been stored in the memory 640 during the first rendering.

The rendering apparatus 200 may include an output unit 601 and a rendering unit 605. The rendering unit 605 may further include a shading unit 602 and a texture unit 603. Although not illustrated in FIG. 6, the rendering unit 605 may include a separate unit that performs the other rendering operation illustrated in FIG. 1. Although not illustrated in FIG. 6, the rendering apparatus 200 may include the command buffer 310, the command interpreting unit 320, the depth test unit 330, the hierarchical depth buffer 340, and the depth buffer 350 of the rendering apparatus 100 of FIG. 3. The description of FIG. 3 is also applicable to FIG. 6, and thus will not be repeated here.

The rendering apparatus 200 may successively perform the first rendering and the second rendering according to a command from the application 610 or the device driver 620.

In the first rendering, as described with reference to FIG. 3, the output unit 601 may output and store a hierarchical depth value of a hierarchical depth buffer (not illustrated) in the memory 640. The hierarchical depth value of a hierarchical depth buffer (not illustrated) is designated by the application 610 or the device driver 620. The output unit 601 may output and store a depth value of a depth buffer (not illustrated) in the memory 640.

In the second rendering, the rendering unit 605 may perform a rendering operation on an image by using the hierarchical depth value stored in the memory 640 during the first rendering. In the second rendering, the shading unit 602 may perform a shading operation similar to operation S15 of FIG. 1. The shading unit 602 may omit shading or perform a fewer computations with respect to an input pixel according to a result of the depth test of a depth value of the input pixel and a depth value or hierarchical depth value of a pixel corresponding to the input pixel, which has been stored in the memory 640 during the first rendering. The shading unit 602 may request the texture unit 603 to perform the depth test for the depth value of the input pixel.

The texture unit 603 may perform the depth test of the depth value of the input pixel and the depth value or hierarchical depth value of the pixel corresponding to the input pixel, which has been stored in the memory 640 during the first rendering, according to the request from the shading unit 602. The texture unit 603 may transfer a result of the depth test to the shading unit 602. A detailed description will be give with reference to FIG. 7.

The rendering apparatus 200 may store an acquired image in the memory 640, as a result of the second rendering.

Figure 7:
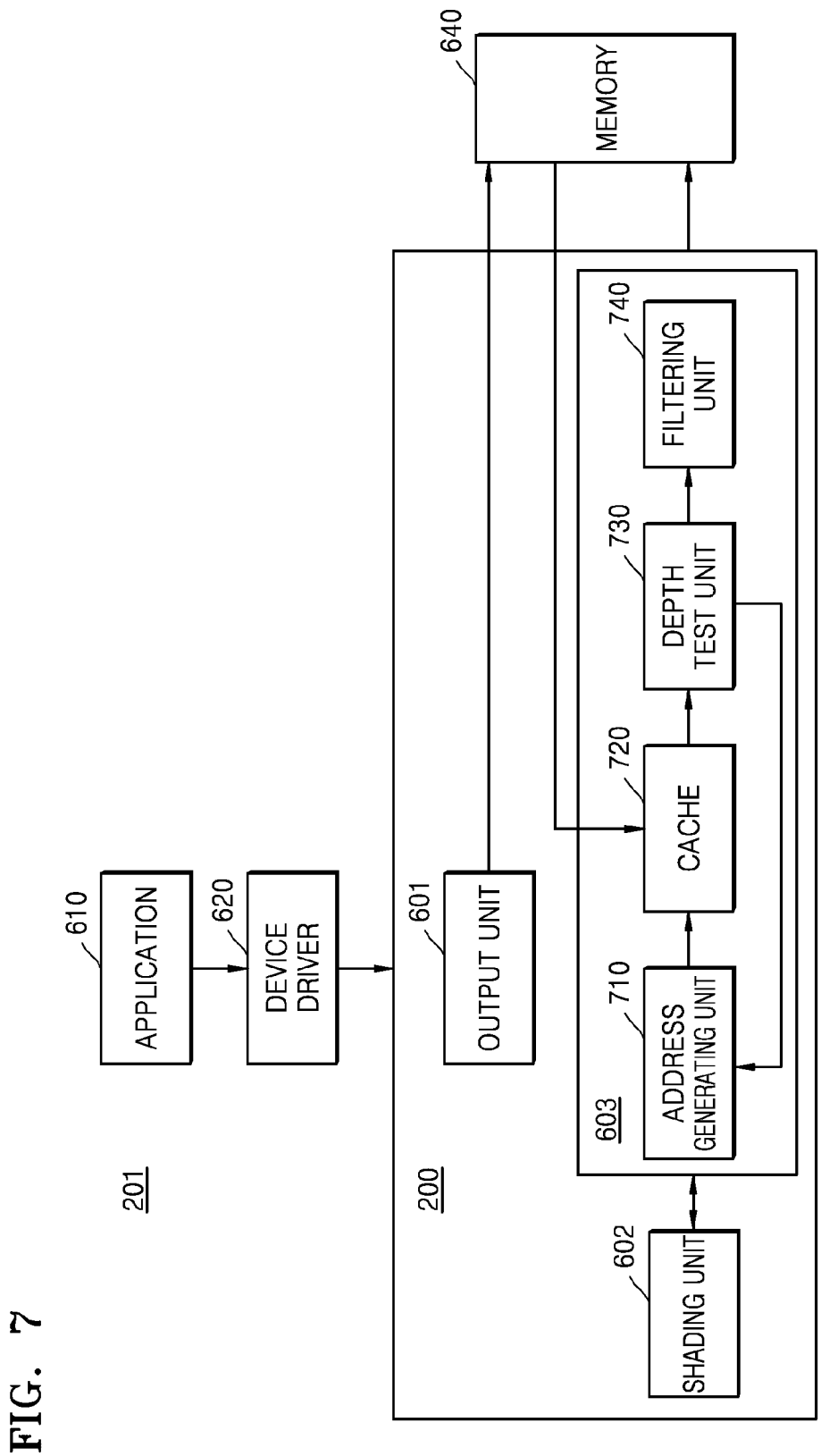
FIG. 7 is a diagram illustrating an example of a texture unit in the rendering system of FIG. 6.

FIG. 7 is a diagram illustrating an example of the texture unit 603 of the rendering system 201 of FIG. 6. The application 610, the device driver 620, the output unit 601, the shading unit 602, and the memory 640 of the rendering system 201 have been described with reference to FIG. 6. The description of FIG. 6 is also applicable to FIG. 7, and thus will not be repeated here. The texture unit 603 may include an address generating unit 710, a cache 720, a depth test unit 730, and a filtering unit 740.

The address generating unit 710 may generate an address for a hierarchical depth value corresponding to a specific pixel of an input image, from among hierarchical depth values that are previously stored in the memory 640. When the hierarchical depth values that are previously stored in the memory 640 are stored in the form of a texture image, the address generating unit 710 may generate an address of a specific texel in the texture image, corresponding to a specific pixel of an input image.

Figures 8, 9:
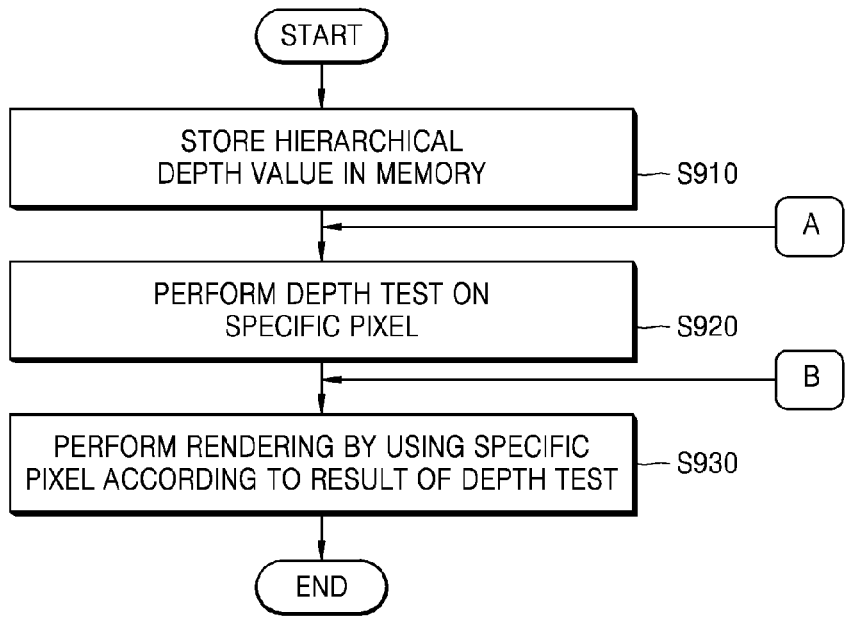
FIG. 8 is a diagram illustrating an example of information on hierarchical depth texture.
FIG. 9 is a diagram illustrating an example of a method of rendering.

The address generating unit 710 may receive a normalized coordinate value (hereinafter, (u, v) value) representing a coordinate of the specific pixel of the input image and a depth value of the specific pixel of the input image from the shading unit 602. The address generating unit 710 may receive information on the texture image including hierarchical depth values which are stored in the memory 640, from a command interpreting unit (not illustrated) included in the rendering apparatus 200 (hereinafter, the texture image including the hierarchical depth values is referred to as a "hierarchical depth texture"). As illustrated in FIG. 8, the information on the hierarchical depth texture may be configured in the form of a table. Therefore, the address generating unit 710 may generate an address of each texel, which is a comparison reference for the hierarchical depth texture, based on the received coordinate value of the specific pixel of the input image (u, v) value, the depth value of the specific pixel of the input image, and the information on the hierarchical depth texture.

When a table illustrated in FIG. 8 is taken as an example, a description is given where the address generating unit 710 receives (½, ½) as the (u, v) value, Ref_z as a depth value of the specific pixel of the input image, and 0 as an identification (ID) of a hierarchical depth texture. The address generating unit 710 may check the number of hierarchical levels in a hierarchical depth texture corresponding to an ID of 0 and select an uppermost hierarchical level, that is, 9 according to the present example. The address generating unit 710 may calculate a coordinate value of the hierarchical depth texture at a lowermost hierarchical level. For example, as illustrated in FIG. 8, when a size ((W, H)) of the texture is (512, 512), the coordinate value of the hierarchical depth texture at the lowermost hierarchical level may be (256, 256) resulting from an operation between (½, ½) and (512, 512). The address generating unit 710 may perform shift operation until 9, i.e., the uppermost hierarchical level selected based on the computed coordinate value of the texture to acquire (s, t). The address generating unit 710 computes an offset by using the acquired (s, t) through the following Equation 1:

$$\text{offset} = s \times \left(\frac{\text{Bytes}}{\text{Texel}}\right) + t \times \left(\frac{\text{Bytes}}{\text{Texel}}\right) \quad \text{Equation 1}$$

In Equation 1, Bytes/Texel is as illustrated in FIG. 8.

Thereafter, the address generating unit 710 may compute a base address in a current stage (for example, the uppermost hierarchical level, i.e., 9) through the following Equation 2.

$$\text{Base Address in current stage} = \quad \text{Equation 2}$$
$$(\text{Base Address}) + \sum_{k=1}^{\text{level}-1} W^{k-1} H^{k-1} \left(\frac{\text{Bytes}}{\text{Texel}}\right)$$

In Equation 2, Base address, W, H, and Bytes/Texel are the same as illustrated in FIG. 8, and level denotes a level in a current stage (for example, the uppermost hierarchical level, i.e., 9).

The address generating unit may generate a final address of the texel in the hierarchical depth texture corresponding to a specific pixel of an input image by performing computation to add the offset calculated in Equation 1 to the base address in the current stage which is calculated in Equation 2.

The address generating unit 710 may transfer the address of the texel in the hierarchical depth texture to the cache 720.

The cache 720 may load the hierarchical depth value from the memory 640. The hierarchical depth value may correspond to the address of the texel that is transferred from the address generating unit 710. In another example, the cache 720 may hold the hierarchical depth value corresponding to the address of the texel that is transferred from the address generating unit 710. Therefore, the cache 720 may transfer the hierarchical depth value held by the cache itself or loaded from the memory 640 to the depth test unit 730.

The depth test unit 730 may compare the depth value of the specific pixel of the input image that is transferred from the address generating unit 710 with the depth value of the specific hierarchical level that is transferred by the cache 720. When the depth value of the specific pixel is smaller than the depth value of the specific hierarchical level, the depth test unit 730 may transfer a result indicating the determination suspension at a current hierarchical level to the address generating unit 710. When the depth value of the specific pixel is larger than the depth value of the specific hierarchical level as a result of the comparing, the depth test unit 730 transfers a result thereof to the filtering unit 740.

When the determination suspension is received from the depth test unit 730, the address generating unit 710 may generate an address value for a lower hierarchical level than the current hierarchical level at which the depth test has been performed. Thereafter, the depth test of a depth value at the lower hierarchical level and the depth value of the specific pixel of the input image may be performed. The above operation may be repeatedly performed according to whether the depth test unit 730 indicates the determination suspension.

The depth test unit 730 may compare the depth value of the specific pixel of the input image with a depth value of a lowermost hierarchical level.

The filtering unit 740 performs an averaging operation on the specific pixel of the input image that has passed the depth test. The texture unit 603 may transfer a result of the depth test for the specific pixel of the input image to the shading unit 602.

The rendering apparatus 200 may perform rendering successively. It is possible to reduce the computational amount in the second rendering operation by using the hierarchical depth value that is generated in the first rendering operation and stored in the memory when the second rendering is performed. For example, in multi-pass rendering, an image generated in a certain stage is used as a texture image in a next stage to generate a final image. The depth test operation is performed through the depth value in the depth texture image by using the depth buffer in a previous stage as a depth texture image in a next stage. Thus, it is possible to reduce the computational amount when the depth test operation is performed through the hierarchical depth value in the depth texture image by using the hierarchical depth buffer in a previous stage as a texture image in a next stage.

FIG. 9 is a diagram illustrating an example of a method of operating rendering apparatus 200. The operations in FIG. 9 may be performed in the sequence and manner as shown, although the order of some operations may be changed or some of the operations omitted without departing from the spirit and scope of the illustrative examples described. Many of the operations shown in FIG. 9 may be performed in parallel or concurrently. The above descriptions of FIGS. 1-8, is also applicable to FIG. 9, and is incorporated herein by reference. Thus, the above description may not be repeated here.

In operation S910, the rendering apparatus 200 may store a hierarchical depth value in a preset memory, when a request is received from an application or a device driver. Operation S910 is similar to operations S410 and S420. The description of operations S410 and S420 is also applicable to S910, and thus will not be repeated here.

In operation S920, the rendering apparatus 200 may perform a depth test on an input specific pixel. The shading unit included in the rendering apparatus 200 may request the texture unit included in the rendering apparatus 200 to perform the depth test for the input specific pixel. Therefore, the texture unit may perform a depth test of a depth value of an input pixel and a depth value or hierarchical depth value of a pixel corresponding to the input pixel, stored in the memory in operation S910. A detailed description operation S920 is described with reference to FIG. 10 below.

In operation S930, the rendering apparatus 200 may render for the input specific pixel according to a result of the depth test of operation S920. As a result of the depth test performed in operation S920, the previously stored depth value or hierarchical depth value corresponding to the input pixel is smaller than the depth value of the input pixel (i.e., when the input pixel is farther from a screen than the previously stored pixel), the rendering apparatus 200 may determine that it is successful and omit shading for the input pixel or perform a lesser number of computations. As a result of the depth test performed in operation S920, the previously stored depth value or hierarchical depth value corresponding to the input pixel is larger than the depth value of the input pixel (i.e., when the input pixel is closer to a screen than the previously stored pixel), the rendering apparatus 200 may perform shading for the input pixel without omitting the shading.

Figure 10:
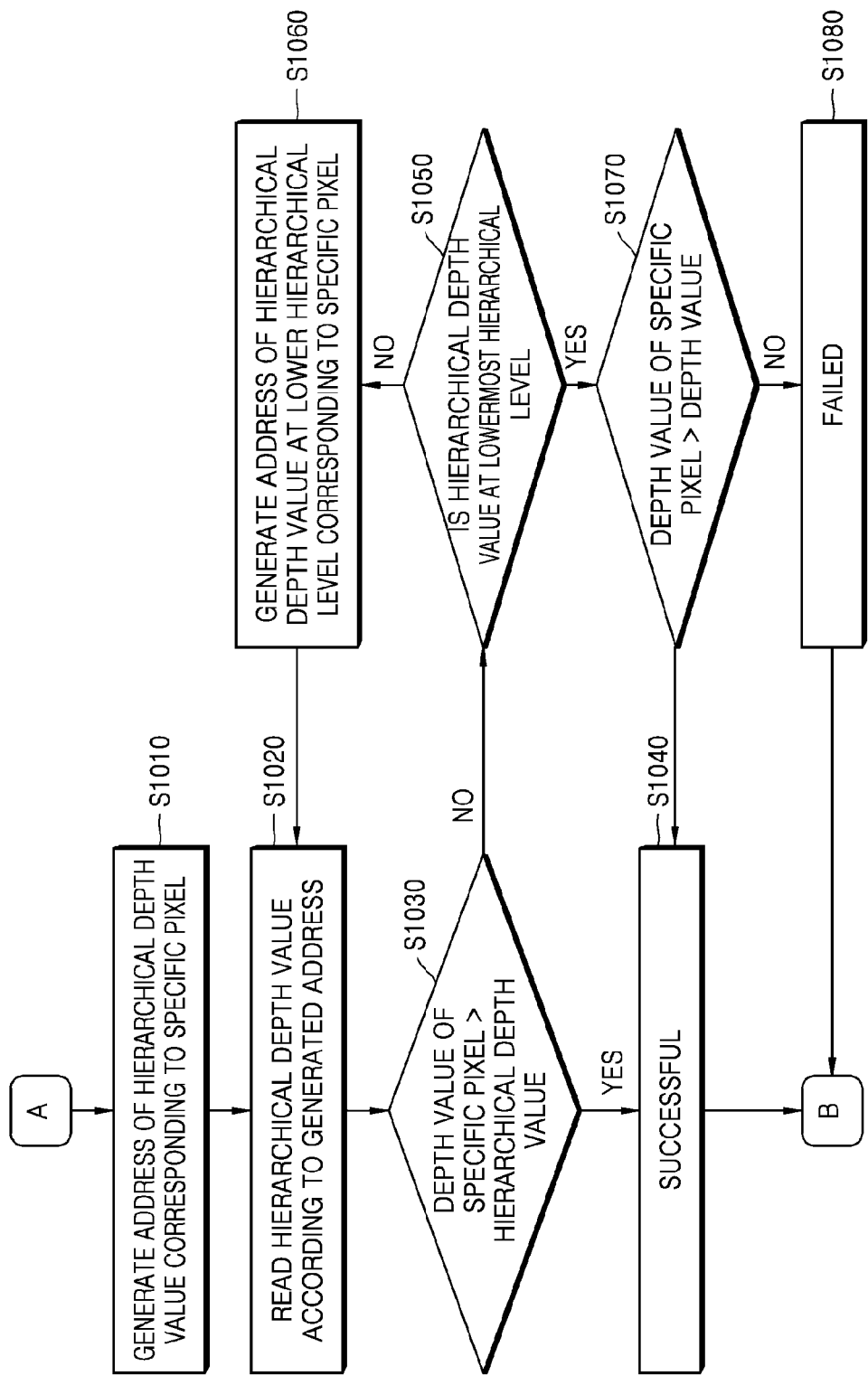
FIG. 10 is a diagram illustrating an example of operation S920 of FIG. 9.

FIG. 10 is a diagram illustrating an example of operation S920 of FIG. 9. The operations in FIG. 10 may be performed in the sequence and manner as shown, although the order of some operations may be changed or some of the operations omitted without departing from the spirit and scope of the illustrative examples described. Many of the operations shown in FIG. 10 may be performed in parallel or concurrently. The above descriptions of FIGS. 1-9, is also applicable to FIG. 10, and is incorporated herein by reference. Thus, the above description may not be repeated here.

In operation S1010, the rendering apparatus 200 may generate an address of a hierarchical depth value corresponding to an input specific pixel. When hierarchical depth values that are previously stored in the memory are stored in the form of a texture image, the address generating unit included in the rendering apparatus 200 may generate an address of a specific texel in the texture image, corresponding to a specific pixel of an input image.

In operation S1020, the rendering apparatus 200 may read a hierarchical depth value according to the address generated in operation S1010. The rendering apparatus may read the hierarchical depth value corresponding to the address of the texel generated in operation S1010 from the memory.

In operation S1030, the rendering apparatus 200 may compare the depth value of the input specific pixel with the hierarchical depth value that is read in operation S1020.

When it is determined that the depth value of the input specific pixel is greater than the hierarchical depth value that is read in operation S1020, i.e., the operation S1030 returns a "Yes," the rendering apparatus 200 determines that a result of the depth test is "successful" (S1040) and performs operation S930 of FIG. 9.

When it is determined that the depth value of the input specific pixel is not greater than the hierarchical depth value that is read in operation S1020, i.e., the operation S1030 returns a "No," in operation S1050, the rendering apparatus 200 determines whether a hierarchical level of the hierarchical depth value that is read in operation S1020 is a lowest hierarchical level.

In operation S1050, when it is determined that the hierarchical level of the hierarchical depth value is not the lowest hierarchical level the rendering apparatus 200 repeatedly performs the depth test by using, as a reference, a hierarchical depth value at a hierarchical level lower than the hierarchical level of the hierarchical depth value which is read in operation S1020. In S1060, the rendering apparatus 200 generates an address of the hierarchical depth value at a lower hierarchical level corresponding to the specific pixel, reads a hierarchical depth value according to the generated address in S1020, and compares the read hierarchical depth value with the depth value of the input specific pixel in S1030. When operation S1030 returns a "No," in the comparison, the rendering apparatus 200 repeatedly performs the above operations depending on whether the hierarchical level of the hierarchical depth value is the lowest hierarchical level.

In operation S1050, when it is determined that the hierarchical level of the hierarchical depth value is the lowest hierarchical level, in S1070, the rendering apparatus 200 compares the depth value stored in the memory with the depth value of the input pixel. In order to compare values, the rendering apparatus 200 may generate an address corresponding to the depth value to read the depth value stored in the memory.

When, as a result of the comparing in value, it is determined as "Yes" in operation S1070, the rendering apparatus 200 determines that the result of the depth test is "successful" (S1040), the rendering apparatus 200 performs operation S930 of FIG. 9. When, as a result of the comparing in value, it is determined as "No" in operation S1070, the rendering apparatus 200 determines that the result of the depth test is "failed" (S1080), the rendering apparatus 200 performs operation S930 of FIG. 9.

Figure 11:
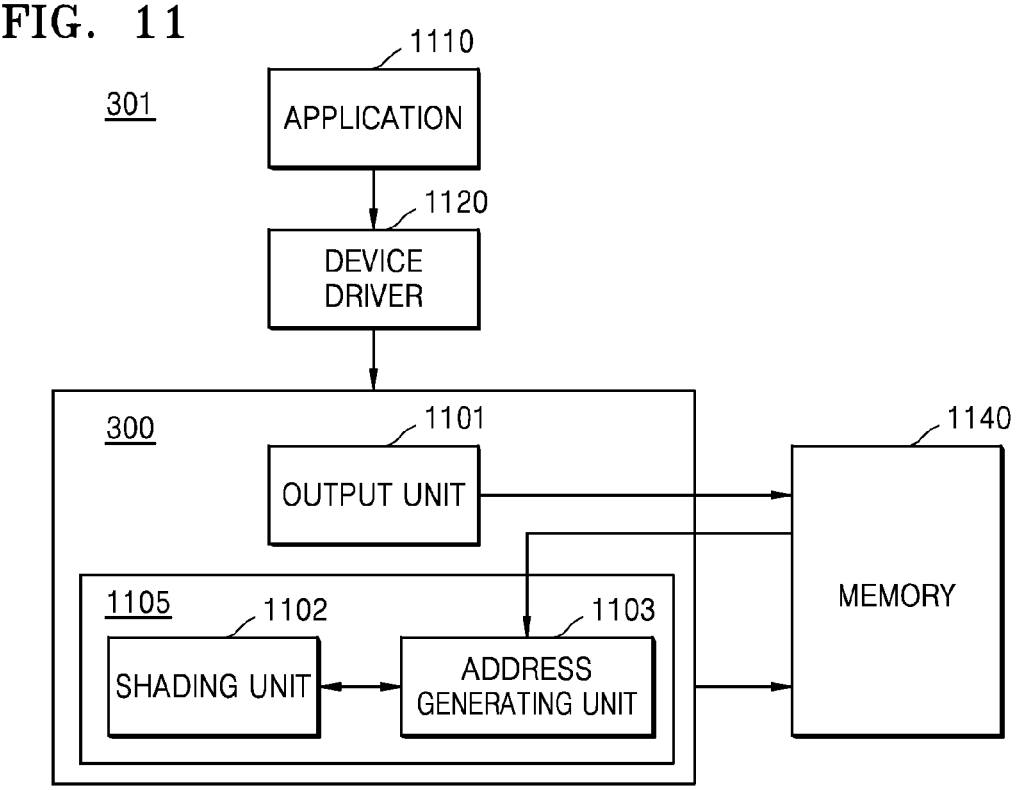
FIG. 11 is a diagram illustrating an example of a rendering system.

FIG. 11 is a diagram illustrating an example of a rendering system 301. The rendering system 301 may include an application 1110, a device driver 1120, a rendering apparatus 300, and a memory 1140.

The application 1110, the device driver 1120, and the memory 1140 are similar to the application 210, the device driver 220, and the memory 240 of FIG. 2. The description of FIG. 2 is also applicable to FIG. 11, and thus will not be repeated here.

The rendering system 301 may perform successive rendering, i.e. for example, the rendering system 301 may generate a final image by using an image generated through first rendering in second rendering.

The device driver 1120 may analyze an API of the application 1110 and instruct the rendering apparatus 300 to store a hierarchical depth value of a specific hierarchical depth buffer in the memory 1140 during the first rendering.

The device driver 1120 may instruct the rendering apparatus 300 to perform the second rendering by using the hierarchical depth value that has been stored in the memory 1140 during the first rendering. The device driver 1120 may instruct the rendering apparatus 300 to perform the second rendering using a hierarchical depth value at a specific hierarchical level, a maximum value, or a minimum value of depth values at specific hierarchical levels, from among hierarchical depth values that has been stored in the memory 1140 when the rendering apparatus 300 performs the second rendering.

As shown in FIG. 11, the rendering apparatus 300 may include an output unit 1101 and a rendering unit 1105. The rendering unit 1105 may further include a shading unit 1102 and an address generating unit 1103, and may further include a separate unit that performs the rendering operation illustrated in FIG. 1. Although not illustrated in FIG. 11, the rendering apparatus 300 may include the command buffer 310, the command interpreting unit 320, the depth test unit 330, the hierarchical depth buffer 340, and the depth buffer 350 of the rendering apparatus 100 of FIG. 3. Since the components have been described with reference to FIG. 3, the description of FIG. 3 is also applicable to FIG. 11, and thus will not be repeated here.

The rendering apparatus 300 may successively perform the first rendering and the second rendering according to a command from the application 1110 or the device driver 1120.

In the first rendering, as described with reference to FIG. 3, the output unit 1101 may output and store a hierarchical depth value of a hierarchical depth buffer (not illustrated) that is designated by the application 1110 and the device driver 1120, in the memory 1140. Also, the output unit 1101 may output and store a depth value of a depth buffer (not illustrated) in the memory 1140.

In the second rendering, the rendering unit 1105 may perform a rendering operation on an image by using the hierarchical depth value stored in the memory 1140 during the first rendering. In the second rendering, the rendering unit 1105 may read a hierarchical depth value or a depth value stored in the memory 1140, and perform computation through the read value.

The shading unit 1102 may request the address generating unit 1103 to read a specific hierarchical depth value of the hierarchical depth values stored in the memory 1140. The specific hierarchical depth value may include a hierarchical depth value corresponding to a specific hierarchical level, and a maximum value or a minimum value of hierarchical depth values corresponding to the specific hierarchical level. The specific hierarchical depth value may be a value falling within a range between the maximum value and the minimum value. Also, the shading unit 1102 may transfer information on the specific hierarchical depth value to the address generating unit 1103. The information on the specific hierarchical depth value may include information such as, for example, information on a specific hierarchical level, information on a coordinate of a specific pixel of an image.

The address generating unit 1103 may generate an address for the specific hierarchical depth value by using information transferred from the shading unit 1102. The address generating unit 1103 may load the specific hierarchical depth value from the memory 1140 according to the generating address, and transfer the specific hierarchical depth value to the shading unit 1102.

The shading unit 1102 may perform computation using a received specific hierarchical depth value.

When performing computation to calculate a range for depth values during a rendering operation, the rendering apparatus 300 may reduce the computation required to acquire the range for depth values using the hierarchical depth values that are previously stored in the memory 1140. For example, in rendering operation of performing tiled deferred shading, the shading unit generates a list of affecting lights for each tile. In this case, the shading unit may generate a list of affecting lights through computation using depth values of an image that have been generated in a previous stage. When the shading unit generates a list of affecting lights for each tile, the shading unit may use the hierarchical depth values previously stored in the memory to reduce the computational amount in the shading unit.

Figure 12:
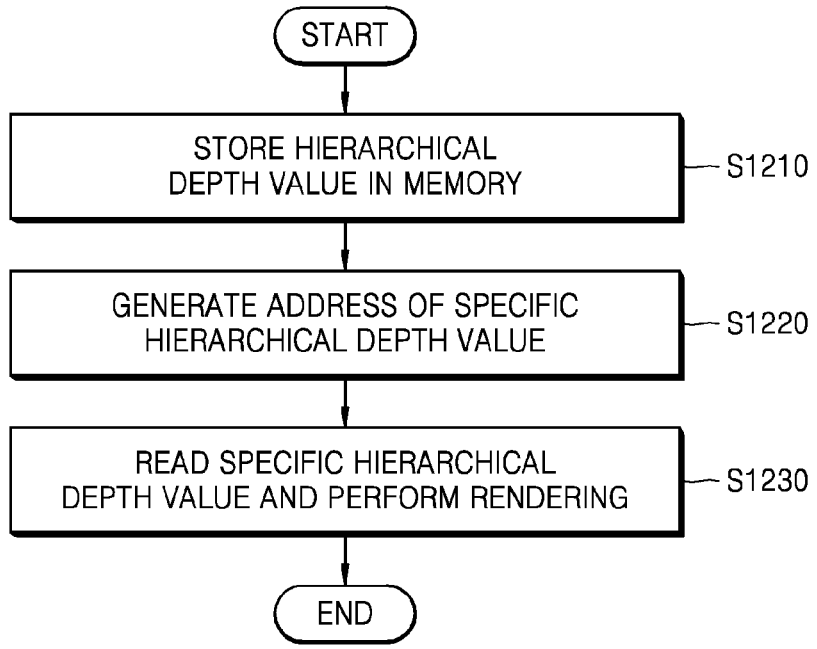
FIG. 12 is a diagram illustrating an example of a method of rendering.

FIG. 12 is a diagram illustrating an example of a method of operating the rendering apparatus 300. The operations in FIG. 12 may be performed in the sequence and manner as shown, although the order of some operations may be changed or some of the operations omitted without departing from the spirit and scope of the illustrative examples described. Many of the operations shown in FIG. 12 may be performed in parallel or concurrently. The above descriptions of FIGS. 1-11, is also applicable to FIG. 12, and is incorporated herein by reference. Thus, the above description may not be repeated here.

In operation S1210, the rendering apparatus 200 may store a hierarchical depth value in a preset memory, in response to a request from an application or a device driver. Since operation S1210 is the same as operation S410 and S420 of FIG. 4, the description of FIG. 4 is also applicable to FIG. 12, and thus will not be repeated here.

In operation S1220, the rendering apparatus 300 may generate an address of a specific hierarchical depth value of hierarchical depth values stored in the memory. The specific hierarchical depth value may include a hierarchical depth value corresponding to a specific hierarchical level, and a maximum value or a minimum value of hierarchical depth values corresponding to the specific hierarchical level. The specific hierarchical depth value may be a value falling within a range between the maximum value and the minimum value. The shading unit included in the rendering apparatus 300 may transfer information on the specific hierarchical depth value to the address generating unit included in the rendering apparatus 300. The information on the specific hierarchical depth value may include information such as, for example, information on a specific hierarchical level, information on a coordinate of a specific pixel of an image. The address generating unit may generate an address for the specific hierarchical depth value by using information on the specific hierarchical depth value transferred from the shading unit.

In operation S1230, the rendering apparatus 300 may read the specific hierarchical depth value according to the address generated in operation S1220 and perform rendering by using the read specific hierarchical depth value.

As described above, the amount of computation performed is reduced in a rendering operation by using a hierarchical depth value stored in a separate memory.

The processes, functions, and methods described above can be written as a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more non-transitory computer readable recording mediums. The non-transitory computer readable recording medium may include any data storage device that can store data that can be thereafter read by a computer system or processing device. Examples of the non-transitory computer readable recording medium include read-only memory (ROM), random-access memory (RAM), Compact Disc Read-only Memory (CD-ROMs), magnetic tapes, USBs, floppy disks, hard disks, optical recording media (e.g., CD-ROMs, or DVDs), and PC interfaces (e.g., PCI, PCI-express, Wi-Fi, etc.). In addition, functional programs, codes, and code segments for accomplishing the example disclosed herein can be construed by programmers skilled in the art based on the flow diagrams and block diagrams of the figures and their corresponding descriptions as provided herein.

The apparatuses and units described herein may be implemented using hardware components. The hardware components may include, for example, controllers, sensors, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a hardware component may include multiple processors or a processor and a controller. In addition, different processing configurations are possible, such a parallel processors.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of rendering comprising:
    receiving a request to output a hierarchical depth value stored in a hierarchical depth buffer;
    obtaining address information of a memory from a device driver;
    outputting the hierarchical depth value from the hierarchical depth buffer;
    storing the hierarchical depth value in the memory according to the address information, in response to the request; and
    performing rendering using the stored hierarchical depth value.

2. The method of claim 1, wherein the receiving of the request comprises receiving a request to output a hierarchical depth value of a specific hierarchical depth buffer, or a hierarchical depth value corresponding to a specific hierarchical level of the hierarchical depth value.

3. The method of claim 1, wherein the performing of the rendering comprises:
    comparing a depth value of a specific pixel with the stored hierarchical depth value; and
    performing rendering on the specific pixel based on the comparison.

4. The method of claim 3, wherein the comparing of the depth value of the specific pixel with the stored hierarchical depth value comprises:
    generating an address of a hierarchical depth value corresponding to the specific pixel;
    reading the hierarchical depth value corresponding to the specific pixel from a memory according to the generated address; and
    comparing the read hierarchical depth value with the depth value of the specific pixel.

5. The method of claim 1, wherein the performing of the rendering comprises:
    generating an address of a specific hierarchical depth value;
    reading the specific hierarchical depth value according to the generated address; and
    performing rendering using the specific hierarchical depth value.

6. The method of claim 5, wherein the specific hierarchical depth value comprises a maximum value or a minimum value of hierarchical depth values.

7. The method of claim 1, further comprising:
    receiving a request to load the hierarchical depth value stored in a memory from application; and
    loading the hierarchical depth value from the memory, in response to the request.

8. The method of claim 1, wherein in response to a first rendering and a second rendering being sequentially performed:
    the storing of the hierarchical depth value comprises outputting the hierarchical depth value from the hierarchical depth buffer and storing the hierarchical depth value in a preset memory based on the request, and
    the performing of the rendering comprises performing rendering using the stored hierarchical depth value in the second rendering.

9. A non-transitory computer-readable storage medium storing instructions that, when executed by a processor, cause the processor to perform the method of claim 1.

10. A rendering apparatus comprising:
    a command buffer configured to receive a request to output a hierarchical depth value stored in a hierarchical depth buffer, and to receive address information of a memory from a device driver;
    an output unit configured to output the hierarchical depth value from the hierarchical depth buffer and to store the hierarchical depth value in the memory according to the address information, in response to the request; and
    a rendering unit configured to perform rendering using the stored hierarchical depth value.

11. The apparatus of claim 10, wherein the command buffer is further configured to receive a request to output a hierarchical depth value of a specific hierarchical depth buffer, or a hierarchical depth value corresponding to a specific hierarchical level of the hierarchical depth value.

12. The apparatus of claim 10, wherein the rendering unit comprises:
    a texture unit configured to compare a depth value of a specific pixel with the stored hierarchical depth value; and
    a shading unit configured to perform rendering on the specific pixel according to the comparison.

13. The apparatus of claim 12, wherein the texture unit comprises:
    an address generating unit configured to generate an address of a hierarchical depth value corresponding to the specific pixel;
    a cache configured to read the hierarchical depth value corresponding to the specific pixel from the memory according to the generated address; and a depth test unit configured to compare the read hierarchical depth value with the depth value of the specific pixel.

14. The apparatus of claim 10, wherein the rendering unit comprises:
    an address generating unit configured to generate an address of a specific hierarchical depth value and to read the specific hierarchical depth value according to the generated address; and
    a shading unit configured to perform rendering using the specific hierarchical depth value.

15. The apparatus of claim 14, wherein the specific hierarchical depth value comprises a maximum value or a minimum value of hierarchical depth values.

16. The apparatus of claim 10, wherein the command buffer receives a request to load the hierarchical depth value stored in the memory from an application; and the output unit is further configured to loads the hierarchical depth value from the memory, in response to the request.

17. The apparatus of claim 10, wherein in response to a first rendering and a second rendering being performed sequentially,
    the output unit is further configured to output the hierarchical depth value from the hierarchical depth buffer and to store the hierarchical depth value in a preset memory based on the request, and
    the rendering unit is further configured to perform rendering using the stored hierarchical depth value in the second rendering.

18. The apparatus of claim 10, wherein the device driver is further configured to generate a mapping table for an ID and a memory address of each of the hierarchical depth buffer.

* * * * *